United States Patent
Palm

(10) Patent No.: US 9,742,622 B2
(45) Date of Patent: Aug. 22, 2017

(54) EXTENSIBLE INTEROPERABILITY OF NETWORK DEVICES

(71) Applicant: BROADCOM CORPORATION, Irvine, CA (US)

(72) Inventor: Stephen Ray Palm, Irvine, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 227 days.

(21) Appl. No.: 14/625,057

(22) Filed: Feb. 18, 2015

(65) Prior Publication Data
US 2015/0237118 A1    Aug. 20, 2015

Related U.S. Application Data

(60) Provisional application No. 61/945,068, filed on Feb. 26, 2014, provisional application No. 61/944,668, filed on Feb. 26, 2014, provisional application No. 61/942,277, filed on Feb. 20, 2014.

(51) Int. Cl.
*G06F 15/16* (2006.01)
*H04L 12/24* (2006.01)

(52) U.S. Cl.
CPC ........ *H04L 41/022* (2013.01); *H04L 41/0266* (2013.01); *H04L 41/12* (2013.01)

(58) Field of Classification Search
CPC .. G06Q 20/36; G06Q 20/3674; G06Q 20/322; G06Q 30/06; G06F 8/20
See application file for complete search history.

(56) References Cited

U.S. PATENT DOCUMENTS

| | | | | |
|---|---|---|---|---|
| 2004/0148416 A1* | 7/2004 | Aarnos | ............. | H04L 29/12066 709/230 |
| 2004/0225952 A1* | 11/2004 | Brown | ....................... | G06F 8/20 714/819 |
| 2005/0204289 A1* | 9/2005 | Mohammed | .......... | H04L 65/605 715/731 |
| 2005/0222969 A1* | 10/2005 | Yip | ..................... | H04L 41/0813 |

(Continued)

*Primary Examiner* — Peling Shaw
(74) *Attorney, Agent, or Firm* — McDermott Will & Emery LLP

(57) ABSTRACT

The subject system allows network devices utilizing any number of networking technologies (including to-be-developed technologies) to access a common abstraction layer and/or the network operations facilitated by a common abstraction layer. The subject system allows a device that is added to a network to communicate whether existing devices on the network should retrieve communication protocol information for facilitating communication with the added device from a remote server. For example, the devices may locally store communication protocol information for certain network technologies, e.g. legacy network technologies, while information corresponding to other network technologies may not be locally stored. The added device may provide a resource locator to the existing devices for accessing the communication protocol information from the remote server. The existing network devices may retrieve the communication protocol information via the resource locator, and may utilize the communication protocol information to facilitate communication with the added device.

20 Claims, 5 Drawing Sheets

(56) References Cited

U.S. PATENT DOCUMENTS

| | | | | |
|---|---|---|---|---|
| 2008/0155085 A1* | 6/2008 | Yokoyama | ............... | H04L 41/12 709/223 |
| 2008/0212591 A1* | 9/2008 | Wu | ......................... | H04L 47/15 370/395.21 |
| 2012/0330764 A1* | 12/2012 | Nahidipour | ......... | G06Q 20/3278 705/17 |
| 2013/0331094 A1* | 12/2013 | Egan | ..................... | H04W 88/06 455/426.1 |
| 2014/0036917 A1* | 2/2014 | Schrum, Jr. | ............ | H04L 61/103 370/392 |
| 2014/0233576 A1* | 8/2014 | Vazquez | ................. | H04L 49/25 370/400 |
| 2014/0310383 A1* | 10/2014 | Liu | ....................... | H04L 41/028 709/218 |
| 2015/0093996 A1* | 4/2015 | Ghaboosi | ............... | H04W 24/02 455/67.11 |

* cited by examiner

EXTENSIBLE INTEROPERABILITY OF NETWORK DEVICES

CROSS-REFERENCE TO RELATED APPLICATIONS

The present application claims the benefit of U.S. Provisional Patent Application Ser. No. 61/942,277, entitled "Extensible Interoperability of Network Devices," filed on Feb. 20, 2014, U.S. Provisional Patent Application Ser. No. 61/944,668, entitled "Extensible Interoperability of Network Devices," filed on Feb. 26, 2014, and U.S. Provisional Patent Application Ser. No. 61/945,068, entitled "Extensible Interoperability of Network Devices," filed on Feb. 26, 2014, each of which is hereby incorporated by reference in its entirety for all purposes.

TECHNICAL FIELD

The present description relates generally to interoperability of network devices, including extensible interoperability of network devices across multiple networking technologies.

BACKGROUND

Network devices in a network environment may support one or more networking technologies, including both wireless and wired networking technologies. As additional wireless and/or wired networking technologies are developed, network devices supporting these networking technologies may be added to the network environment.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
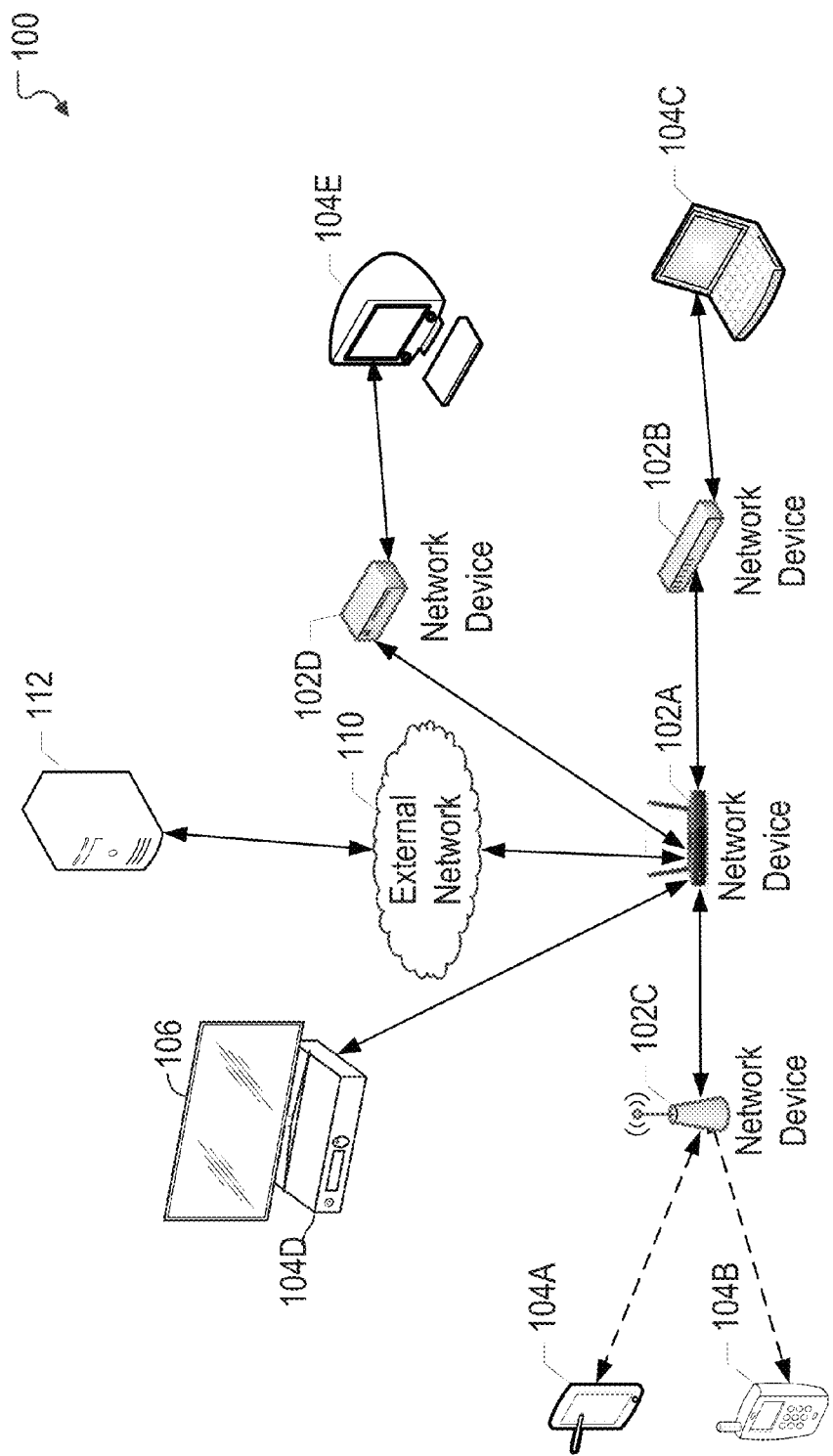
FIG. 1 illustrates an example network environment in which a system for extensible interoperability of network devices may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject system for extensible interoperability of network devices allows network devices utilizing any number of networking technologies (including to-be-developed networking technologies) to access a common abstraction layer and/or the network operations facilitated by a common abstraction layer, such as the abstraction layer provided for in the Institute of Electrical and Electronics Engineers (IEEE) 1905.1 Standard and it amendments and revisions. In particular, the subject system allows a device that is added to a network to communicate whether existing devices on the network should retrieve communication protocol information for facilitating communication with the added device via a local data store or via a remote server. For example, the devices may have communication protocol information for certain network technologies, e.g. legacy network technologies that are included in the IEEE 1905.1 Standard (or other standard), stored on a local data store, while communication protocol information for other network technologies, such as newly developed networking technologies, may be stored at a remote server. The added device may provide a resource locator to the existing devices for accessing the communication protocol information from the remote server, if necessary. The existing network devices may retrieve the communication protocol information from the remote server via the resource locator, and may utilize the communication protocol information to facilitate communication with the added device.

In this manner, the subject system allows extensible interoperability between devices that utilize legacy networking technologies and devices that utilize newly developed networking technologies. Thus, the subject system provides a framework for extending network device interoperability (e.g. via IEEE 1905.1 or other standard) to additional networking technologies not supported by the original standard, as well as any networking technologies developed subsequent to the standard being finalized, e.g. without having to revise the provisions of the standard. The framework also enables backwards compatibility with legacy devices that support the original standard (e.g. IEEE 1905.1 or other standard) such that the legacy devices are interoperable across the additional networking technologies.

FIG. 1 illustrates an example network environment 100 in which a system for extensible interoperability of network devices can be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes one or more network devices 102A-D, one or more electronic devices 104A-E, an external network 110, and a remote server 112. In one or more implementations, one or more of the network devices 102A-D are referred to as bridge devices or management entities, while one or more of the electronic devices 104A-F are referred to as network devices, e.g. in addition to the network devices 102A-D. The network devices 102A-D and electronic devices 104A-E may be communicably coupled, or capable of being communicably coupled, via one or more networking technologies, such as Wi-Fi, MoCA, Ethernet, HomePlug, powerline, Bluetooth, ZigBee, other wireless or wired networking technologies. In one or more implementations, the network device 102A also operates as a gateway device that couples the other network devices 102B-D, and the electronic devices 104A-E, to the external network 110, such as the Internet, and the remote server 112. One or more of the network devices 102A-D, the electronic devices 104A-E, and/or the remote server 112 may be, and/or may include all or part of, the electronic system discussed below with respect to FIG. 5. A customer service or network technician located also outside the network may also access the information in the network and then from the resource locator also access remote server 112 to obtain information to guide the user of the network.

The electronic devices 104A-E can be computing devices such as laptop or desktop computers, smartphones, set-top boxes, tablet devices, televisions or other displays with one or more processors coupled thereto and/or embedded therein, or other appropriate computing devices or things (e.g. Internet of Things) that, for example, include one or more network interfaces and/or can be coupled to a device that includes one or more network interfaces. In the example of FIG. 1, the electronic device 104A is depicted as a tablet device, the electronic device 104B is depicted as a smartphone, the electronic device 104C is depicted as a laptop computer, the electronic device 104D is depicted as a set-top box device, and the electronic device 104E is depicted as a desktop computer. The set-top box device may be coupled to, and capable of presenting video content on, an output device 106, such as a television, a monitor, speakers, or any device capable of presenting video content. In one or more implementations, the set-top box device is integrated into the output device 106 and the output device 106 is referred to as a network device.

The network devices 102A-D may include one or more networking devices such as switches, routers, bridges, media converters, or generally any networking devices. In the example of FIG. 1, the network device 102A is depicted as a Multimedia over Coax Alliance (MoCA) bridge, the network device 102B is depicted as powerline bridge, such as an Institute of Electrical and Electronics Engineers (IEEE) 1901 bridge, the network device 102C is depicted as a wireless bridge, such as a IEEE 802.11 bridge, and the network device 102D is depicted as a bridge for an additional networking technology, such as a networking technology other than one or more variants of MoCA, one or more variants of IEEE 1901, one or more variants of IEEE 802.11 and/or one or more variants of IEEE 802.3. Thus, the network devices 102A-D may each include at least two different types of network interfaces in order to provide the bridging functionality. Furthermore, in the example of FIG. 1, the electronic device 104D may include and/or may be coupled to at least a MoCA network interface, the electronic device 104C may include and/or may be coupled to at least a powerline network interface, the electronic devices 104A-B may include and/or may be coupled to at least a wireless network interface, and the electronic device 104E may include and/or may be coupled to at least a network interface of the additional networking technology.

Thus, the example network environment 100 can utilize multiple wireless and wireline networking technologies to provide for network communications between one or more of the network devices 102A-D, and/or the electronic devices 104A-E. In order to facilitate management of the example network environment 100, the network devices 102A-D and/or the electronic devices 104A-E may utilize an abstraction layer that hides the diversity of media access control across the different networking technologies, such as the abstraction layer provided for in the IEEE 1905.1 standard and amendments. The abstraction layer facilitates one or more network operations across the different networking technologies, such as topology discovery, diagnostics, security setup, configuration of secondary wireless access points, enhanced path selection and/or enhanced power management. The abstraction layer provides unique addresses for identifying the network devices and the different networking technologies.

Communication protocol information, e.g. configuration parameters, security information, etc., for some of the networking technologies (with regard to the abstraction layer) are pre-configured and locally stored at the network devices 102A-D and/or the electronic devices 104A-E, and/or information for accessing such communication protocol information is stored locally at the network devices 102A-D and/or the electronic devices 104A-E. In one or more implementations, these networking technologies may include one or more variants of MoCA, one or more variants of IEEE 1901, one or more variants of IEEE 802.11 and/or one or more variants of IEEE 802.3. However, communication protocol information for other networking technologies and/or variants (with regard to the network abstraction layer) may be stored at the remote server 112, such as in the form of one or more extensible markup language (XML) documents. Thus, the attributes and/or configuration parameters associated with a networking technology and/or variant, such as a networking technology and/or variant not included in the IEEE 1905.1 standard (or other standard), may be published in a network accessible document, such as an XML document on the remote server 112, and therefore do not need to be pre-configured and stored at the network devices 102A-D and/or the electronic devices 104A-E. In one or more implementations, the communication protocol information, e.g. in the form of one or more XML documents, for each additional networking technology is stored at a different remote server 112.

In operation, the network devices 102A-D and/or the electronic devices 104A-E (collectively referred to as devices 102A-D, 104A-E) connect to the network environment 100 and exchange notification messages that indicate the network addresses of the devices 102A-D, 104A-E. The devices 102A-D, 104A-E utilize the network addresses to request topology information from any of the other devices 102A-D, 104A-E that are unknown and/or newly added to the network environment 100. The topology information may include an indication of whether the communication protocol information for the other devices 102A-D, 104A-E is locally accessible, or should be retrieved, such as from the remote server 112.

If the topology information indicates that the communication protocol information should be retrieved, such as from the remote server 112, for a given device, such as the network device 102D and/or the electronic device 104E, one or more of the other devices 102A-C, 104A-D transmits a request to the network device 102D to obtain a resource locator for accessing the communication protocol information. The network device 102D subsequently responds with a message that includes the resource locator. One or more of the devices 102A-C, 104A-E then retrieve the communication protocol information via the resource locator, such as from the remote server 112. In one or more implementations, the communication protocol information for the network device 102D can be retrieved from any location identifiable by the resource locator, such as from the network device 102D itself, and/or from any device coupled to the external network 110.

One or more of the devices 102A-C, 104A-D utilize at least a portion of the communication protocol information to facilitate communication with the network device 102D, and/or the electronic device 104E. For example, the communication protocol information may include information for implementing a security mechanism utilized by the network device 102D and/or the electronic device 104E. Example processes of one or more of the devices 102A-D, 104A-E implementing the subject technology are discussed further below with respect to FIGS. 3 and 4.

Figure 2:
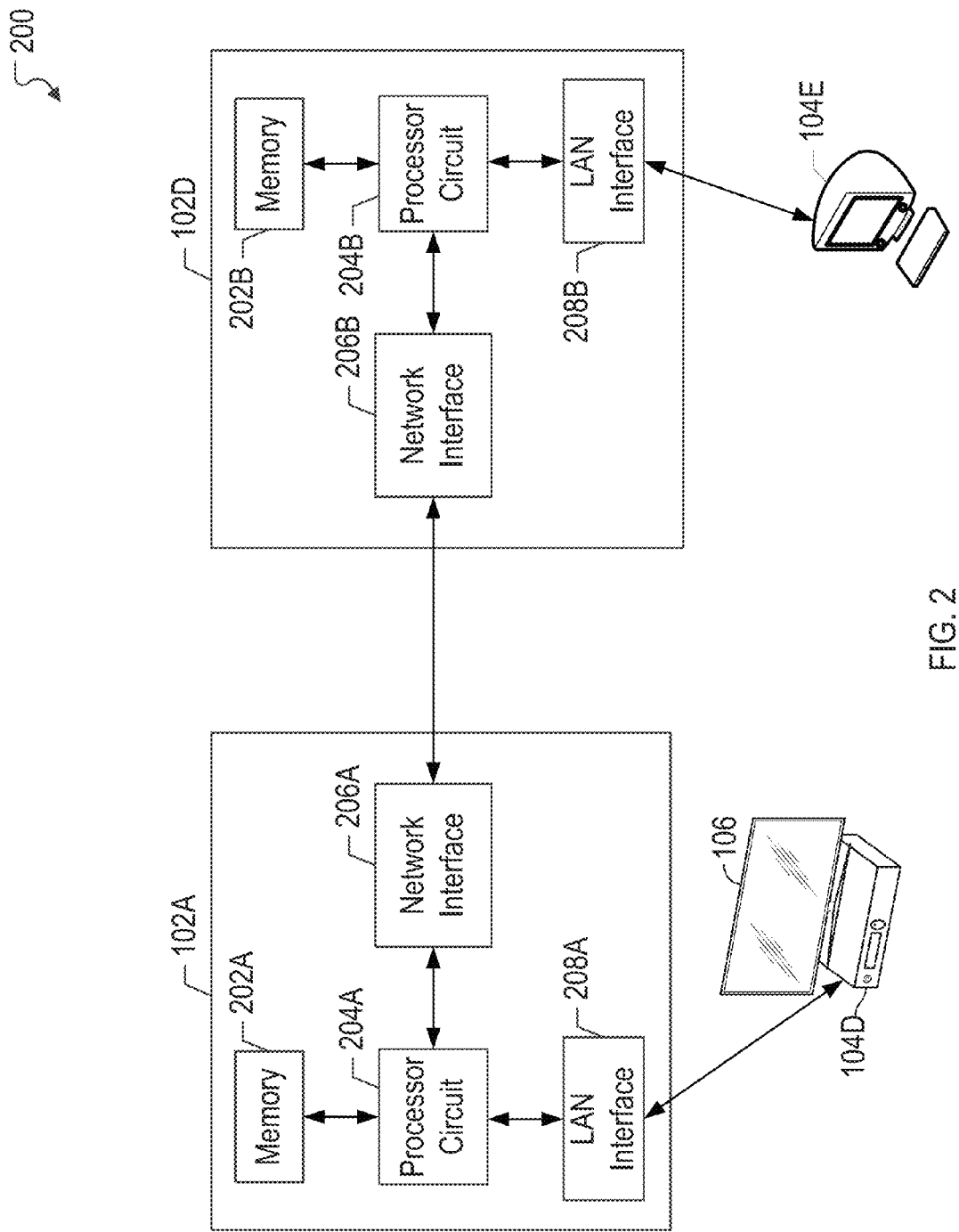
FIG. 2 illustrates an example network environment in which a system for extensible interoperability of network devices may be implemented in accordance with one or more implementations.

FIG. 2 illustrates an example network environment 200 in which a system for discovery of services over infrastructure networks may be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The network environment 200 includes the network devices 102A,D, the electronic devices 104D,E, and the output device 106. The network device 102A includes a memory 202A, a processor circuit 204A, a network interface 206A, and a local area network (LAN) interface 208A. The network device 102D includes a memory 202B, a processor circuit 204B, a network interface 206B, and a LAN interface 208B. In the example of FIGS. 1 and 2, the network device 102A is illustrated as MoCA bridge and the network device 102D is illustrated as a bridge of an additional networking technology, such as a networking technology that is not described in the IEEE 1905.1 standard.

Thus, the LAN interface 208A of the network device 102A is a MoCA interface, while the LAN interface 208B of the network device 102D is an interface of the additional networking technology. The network device 102A is coupled to the electronic device 104D via a MoCA connection through the LAN interface 208A, while the network device 102D is coupled to the electronic device 104E via a connection of the additional networking technology via the LAN interface 208B.

For explanatory purposes, the connection between the LAN interface 208B and the electronic device 104E is illustrated in FIG. 2 as a solid line; however, the connection may be a wired or wireless connection. Further for explanatory purposes, a single electronic device 104D is illustrated in FIG. 2 as being communicatively coupled to the LAN interface 208A; however, any number of electronic devices may be communicatively coupled to the LAN interface 208A, such as via a MoCA network and/or one or more MoCA network devices. Similarly, for explanatory purposes, a single electronic device 104E is illustrated in FIG. 2 as being communicatively coupled to the LAN interface 208B; however, any number of electronic devices may be communicatively coupled to the LAN interface 208B, such as via a network of the additional networking technology and/or one or more network devices implementing the additional networking technology.

The network interfaces 206A-B utilize a common networking technology, such as an Ethernet networking technology, such that the network devices 102A,D may communicate with one another. In one or more implementations, the network interfaces 206A-B may utilize different networking technologies and one or more intermediate network devices (not shown) may facilitate communication between the network devices 102A,D. Thus, the network devices 102A,D bridge the electronic devices 104D,E, such that the electronic devices 104D,E may communicate with one another even though the electronic devices 104D,E utilize different network interfaces, e.g. MoCA and the additional networking technology.

In one or more implementations, one or more of the memories 202A-B, the processor circuits 204A-B, the network interfaces 206A-B, and/or the LAN interfaces 208A-B may be implemented in software (e.g., subroutines and code) and/or in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
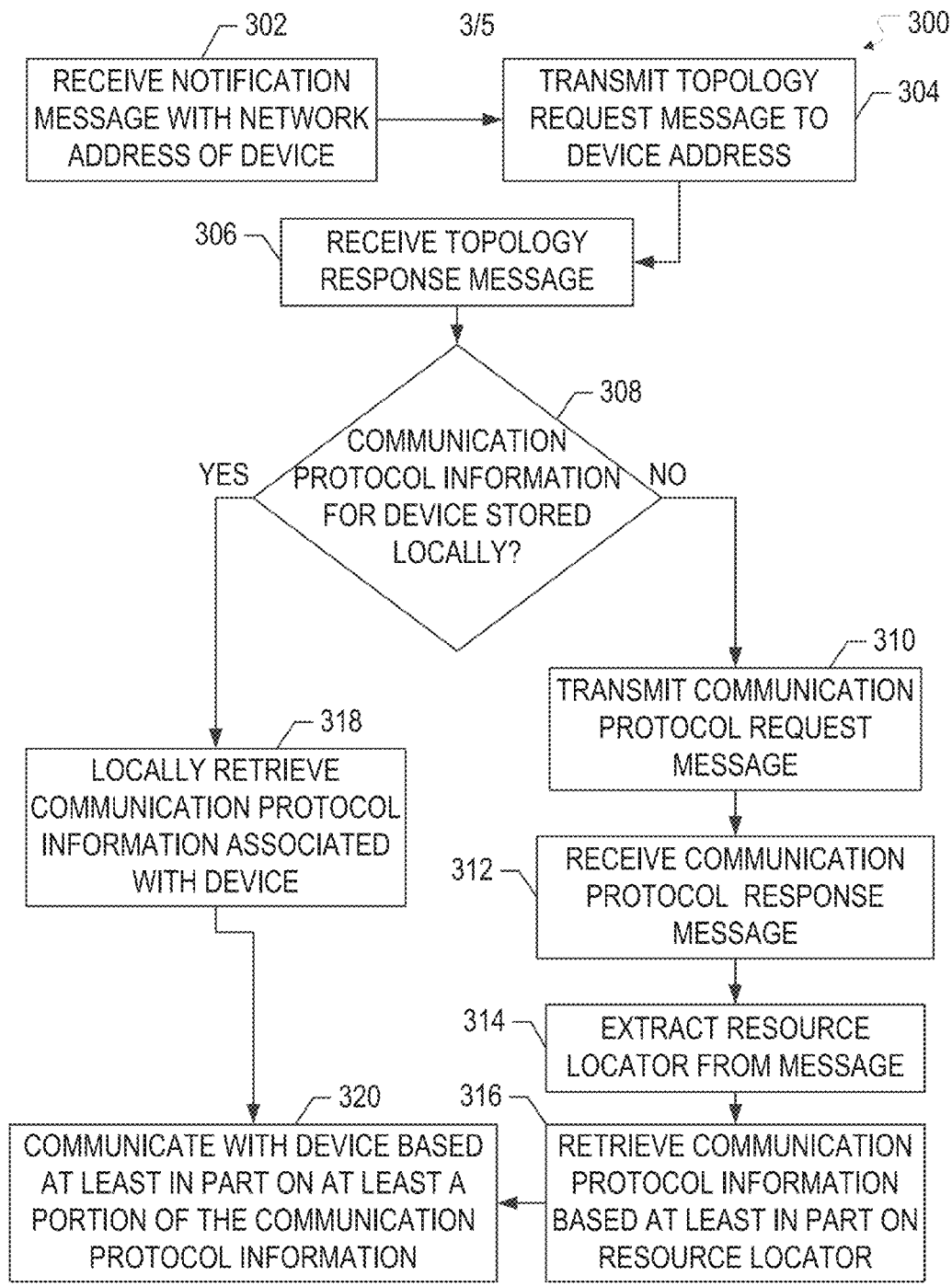
FIG. 3 illustrates a flow diagram of an example process of a network device in a system for extensible interoperability of network devices in accordance with one or more implementations.

FIG. 3 illustrates a flow diagram of an example process 300 of a network device 102A in accordance with one or more implementations. For explanatory purposes, the example process 300 is primarily described herein with reference to the network device 102A of FIGS. 1-2; however, the example process 300 is not limited to the network device 102A of FIGS. 1-2, e.g. the example process 300 may be performed by one or more of the other devices 102B-D, 104A-E and/or the example process 300 may be performed by one or more components of the network device 102A. Further for explanatory purposes, the blocks of the example process 300 are described herein as occurring in serial, or linearly. However, multiple blocks of the example process 300 may occur in parallel. In addition, the blocks of the example process 300 may be performed a different order than the order shown and/or one or more of the blocks of the example process 300 may not be performed.

The network device 102A receives a notification message, such as a discovery message, from one of the other devices 102B-D, 104A-E, such as the network device 102D, that is newly added to the network environment 100, or previously unknown to the network device 102A (302). In one or more implementations, the notification message is a multicast or broadcast message. In response to receiving the notification message from the network device 102D (302), the network device 102A transmits a topology request message that is addressed to the network address of the network device 102D (304). In response to transmitting the topology request message to the network device 102D (304), the network device 102A receives a topology response message from the network device 102D (306). In one or more implementations, the topology request and topology response messages are unicast messages.

The topology response message includes one or more type length value (TLV) elements corresponding to the network device 102D and/or one or more devices neighboring the network device 102D, such as the electronic device 104E. One of the TLVs included in the topology response message is a device information type TLV. The device information type TLV includes a 16 bit media type value that indicates the networking technology variant, or communication protocol, utilized by the network device 102D. In one or more implementations, the most significant 8 bits of the media type value are indicative of a networking technology and the least significant 8 bits of the media type value are indicative of a particular variant of the networking technology. Example media type values are shown below in Table 1.

TABLE 1

Example Media Type Values

| Media Type (intfType) | | Description | Media-Specific Information |
| --- | --- | --- | --- |
| (Bits 15 to 8) | (Bits 7 to 0) | | (n octets) |
| 0 | 0 | IEEE 802.3u Fast Ethernet | N/A (n = 0) |
|  | 1 | IEEE 802.3ab Gigabit Ethernet | N/A (n = 0) |
|  | 2~255 | Reserved Values | Reserved (n = 0) |
| 1 | 0 | IEEE 802.11b (2.4 GHz) | n = 10 |
|  | 1 | IEEE 802.11g (2.4 GHz) | |
|  | 2 | IEEE 802.11a (5 GHz) | |
|  | 3 | IEEE 802.11n (2.4 GHz) | |
|  | 4 | IEEE 802.11n (5 GHz) | |
|  | 5 | IEEE 802.11ac(5 GHz) | |
|  | 6 | IEEE 802.11ad (60 GHz) | |
|  | 7 | IEEE 802.11af (Whitespace) | |
|  | 8~255 | Reserved Values | Reserved (n = 0) |
| 2 | 0 | IEEE 1901 Wavelet | Network membership: Network Identifier (NID) n = 7 |
|  | 1 | IEEE 1901 FFT | |
|  | 2~255 | Reserved Values | Reserved |
| 3 | 0 | MoCA v1.1 | n = 0 |
|  | 1~255 | Reserved Values | |
| 4 to 254 | 0~255 | Reserved Values | Reserved (n = 0) |
| 255 or (0xFF) | 255 | Unknown Media | n = 0 |

If the network device 102D utilizes one of the known networking technologies listed in Table 1, the network device 102D utilizes the media type values in Table 1 that are associated with the networking technology. However, if the network device 102D utilizes a networking technology, or variant thereof, that is not listed in Table 1, such as a newly developed networking technology, the network device 102D sets the media type value associated with "Unknown Media" in Table 1, e.g. 255 (or 0xFF in hexadecimal) for bits 15 to 8 and/or bits 7 to 0.

Thus, upon receiving the topology response message, including the media type TLV, the network device 102A determines whether communication protocol information associated with the network device 102D is stored locally, or should be retrieved, such as from the remote server 112 (308). For example, the network device 102A may be pre-configured to locally store communication protocol information (or information for remotely accessing such communication protocol information) for one or more of the existing networking technologies listed in Table 1 above, such as IEEE 802.3, IEEE 802.11, IEEE 1901, and/or MoCA, and/or variants thereof. Thus, if bits 15-8 of the media type TLV of the topology response message received from the network device 102D are set to 0, 1, or 2, the network device 102A determines that the communication protocol information associated with the network device 102D (and/or information for remotely accessing such communication protocol information) is stored locally at the network device 102A. However, if bits 15-8 of the media type TLV are set to 255 (or hexadecimal 0xFF) or any other value not in the table, the network device 102A determines that the communication protocol information associated with the network device 102D (and/or information for remotely accessing such communication protocol information) is not stored locally at the network device 102A. Since the media type value is indicative of whether the communication protocol information is stored locally at the network device 102A, the media type value may also be referred to as a communication protocol indicator.

If the network device 102A determines that the communication protocol information (and/or information for accessing the communication protocol information) is not stored locally (308), the network device 102A transmits a communication protocol request message to the network device 102D (310). In one or more implementations, the communication protocol request message is a unicast message and may be referred to as a generic Phy query message. The communication protocol request message includes a new message identifier (MID) value, which may be, for example, a message sequence number.

In response to transmitting the communication protocol request message, the network device 102A receives a communication protocol response message from the network device 102D (312). In one or more implementations, the communication protocol response message is a unicast message and may be referred to as a generic Phy response message. In one or more implementations, the communication protocol response message includes the same message identifier value that was included in the communication protocol request message. The communication protocol response message includes a generic Phy device information type TLV that describes the local network interfaces of the network device 102D. An example generic Phy device information type TLV format is shown below in Table 2.

TABLE 2

Example Generic Phy Device Information Type TLV

| Field | Length | Value | Description |
| --- | --- | --- | --- |
| tlvType | 1 octet | 20 | Generic Phy Device Information Type |
| tlvLength | 2 octets | Variable | Number octets in ensuing field (Note: see 7.1.1 for restrictions on TLV length and splitting) |
| tlvValue | 6 octets | | 1905.1 AL MAC Address of the device |
|  | 1 octet | k | Number of local interfaces |
|  | 6 octets | any EUI-48 value | MAC Address of the local interface |
|  | 3 octets | | OUI of the Generic Phy networking technology of the local interface |
|  | 1 octet | | Variant Index of the Generic Phy networking technology of the local interface |

TABLE 2-continued

Example Generic Phy Device Information Type TLV

| Field | Length | Value | Description |
|---|---|---|---|
| | 32 octets | | Variant Name |
| | 1 octet | u | Number of octets in ensuing URL field |
| | 1 octet | s | Number of octets in ensuing Specific field |
| | u octets | | URL to Generic Phy XML Description represented by the OUI. This URL shall be publicly available |
| | s octets | | Specific information of the Variant |
| | | | The above 8 fields are repeated k − 1 times |

In one or more implementations, the value of the 3 octets corresponding to the IEEE organizationally unique identifier (OUI) or company identifier (CID) of the generic Phy networking technology of the local interface are set based at least in part on a mapping between the media type values of the topology response message and the 3 octets corresponding to the OUI. Table 3 below provides an example mapping from the media type values to the 3 octets corresponding to the OUI.

TABLE 3

Example Media Type Values to OUI Mapping

| OUI | Name | Media Type bits 15 to 8 |
|---|---|---|
| 00:12:0F | IEEE 802.3 | 0 |
| 00:0F:AC | IEEE 802.11 | 1 |
| 0A:87:36 | IEEE 1901 | 2 |
| 00:22:0F | MoCA (Multimedia over Coax Alliance) | 3 |
| (other) | (other) | 255 (or 0xFF) |

The network device 102A extracts a resource locator from the communication protocol response message for accessing the communication protocol information associated with one or more network interfaces of the network device 102D (314). For example, the network device 102A extracts the number of octets corresponding to the "URL to Generic Phy XML Description" as indicated in Table 2 above. For explanatory purposes, the network device 102A is described as extracting a single resource locator from the communication protocol response message; however, the network device 102A may retrieve one or more different resource locators corresponding to one or more network interfaces of the network device 102D that utilize different networking technologies. The network device 102D may also cache remote data so that the data is available for later local use. The cache may be indexed by using information such as the OUI and variant index.

The network device 102A then retrieves the communication protocol information based at least in part on the resource locator (316). The resource locator may be associated with a remote server that is publicly accessible over the external network 110, such as the remote server 112. Thus, the network device 102A may use the resource locator to retrieve the communication protocol information from the remote server 112.

In one or more implementations, the communication protocol information is stored in an XML document and is referred to as a generic Phy XML description document. Thus, a networking technology organization's set of networking technology variants are described in an XML-formatted document that is made publicly available ("published") online by the networking technology organization, e.g. at the remote server 112. The use of an XML-formatted document allows for processing of the communication protocol information in a consistent manner and without human intervention or interpretation, such as by the network device 102A.

A networking technology organization may use an IEEE OUI to identify its networking technology variants in its generic Phy XML description document. In one or more implementations, the generic Phy XML description document may contain the example communication protocol information of the fields described in Table 4. The subfields of NetworkingTechnologyVariant may be repeated for each variant.

TABLE 4

Generic Phy XML Fields

| Field | Sub Field | Description |
|---|---|---|
| OrgName | | Name of the networking technology organization |
| OrgUrl | | URL of the networking technology organization |
| OUI | | OUI of the networking technology organization |
| Networking Technology Variant | GenericPhyIndex | Index of the networking technology variant |
| | VariantName | Name of the networking technology variant |
| | VariantUrl | URL to specification of the networking technology |
| | Description | Brief Description of the networking technology variant |
| | DataPlaneName | Name of the Network Technology variant Data Plane Interface |
| | DataPlaneReference | Section or clause number in Reference Document that describes the Data Plane interface |
| | SMEName | Name of the Network Technology SME |
| | SMEReference | Section or clause number in Reference Document that describes the SME |

TABLE 4-continued

Generic Phy XML Fields

| Field | Sub Field | Description |
|---|---|---|
| | IEEE8021Bridging | True if Network Technology supports IEEE 802.1 bridging |
| | VariantSpecific | Specific information of the Variant |
| | InterfaceTypeMessageArray | Security message_array |
| | UKeyDerivation | String expressing how to derive the Network Technology U-Key from the 1905 network key |
| | Coexistence Mechanism | Name(s) of Coexistence Method used by the networking technology variant |

An example Generic Phy XML Schema is shown in Table 5 below. In one or more implementations, the schemaLocation field of the generic Phy XML description document contains a uniform resource locator (URL) that references a location of "GenericPhyInfoV1.xsd" file.

TABLE 5

Generic Phy XML Schema

```
<?xml version="1.0" encoding="utf-8"?>
<xsd:schema xmlns="urn:schemas-ieee-org:ieee1905:GenericPhyInfo" xmlns:xsd="http://www.w3.org/2001/XMLSchema"
targetNamespace="urn:schemas-ieee-org:ieee1905:GenericPhyInfo" elementFormDefault="qualified" id="GenericPhyInfo">
    <xsd:annotation>
        <xsd:documentation xml:lang="en">
            GenericPhyInfo schema.
        </xsd:documentation>
    </xsd:annotation>
    <xsd:element name="GenericPhyInfo" type="GenericPhyInfoType"/>
    <xsd:complexType name="GenericPhyInfoType">
        <xsd:sequence>
            <xsd:element name="GenericPhy" maxOccurs="1">
                <xsd:complexType>
                    <xsd:sequence>
                        <xsd:element name="OrgName" minOccurs="1" maxOccurs="1">
                            <xsd:simpleType>
                                <xsd:restriction base="xsd:string">
                                    <xsd:maxLength value="128"/>
                                </xsd:restriction>
                            </xsd:simpleType>
                        </xsd:element>
                        <xsd:element name="OrgUrl" minOccurs="1" maxOccurs="1">
                            <xsd:simpleType>
                                <xsd:restriction base="xsd:string">
                                    <xsd:maxLength value="128"/>
                                </xsd:restriction>
                            </xsd:simpleType>
                        </xsd:element>
                        <xsd:element name="Oui" type="OuiType" minOccurs="1" maxOccurs="1"/>
                        <!-- The 24-bit globally unique IEEE-RA assigned number to the vendor -->
                        <xsd:element name="NetworkTechnologyVariant" maxOccurs="unbounded">
                            <xsd:complexType>
                                <xsd:sequence>
                                    <xsd:element name="GenericPhyIndex" type="MediaTypeIndexType" minOccurs="1" maxOccurs="1"/>
                                    <!-- The Organization assigned index for the Media Type bits 7~0 of Table 6-12-->
                                    <xsd:element name="VariantName" minOccurs="1" maxOccurs="1">
                                    <!-- The Name of the Network Technology. Table 6-12 and Data Model-->
                                        <xsd:simpleType>
                                            <xsd:restriction base="xsd:string">
                                                <xsd:maxLength value="128"/>
                                            </xsd:restriction>
                                        </xsd:simpleType>
                                    </xsd:element>
                                    <xsd:element name="VariantUrl" minOccurs="1" maxOccurs="1">
                                    <!-- URL of the Specification or Standard for the Network Techology -->
                                        <xsd:simpleType>
                                            <xsd:restriction base="xsd:string">
                                                <xsd:maxLength value="128"/>
                                            </xsd:restriction>
                                        </xsd:simpleType>
                                    </xsd:element>
                                    <xsd:element name="Description" minOccurs="0" maxOccurs="1">
                                    <!-- Brief description of the Network Technology -->
                                        <xsd:simpleType>
                                            <xsd:restriction base="xsd:string">
                                                <xsd:maxLength value="256"/>
```

TABLE 5-continued

Generic Phy XML Schema

```
        </xsd:restriction>
    </xsd:simpleType>
</xsd:element>
<xsd:element name="DataPlaneName" minOccurs="0" maxOccurs="1">
<!-- Name of the Network Technology Data Plane Interface (4.3)-->
    <xsd:simpleType>
        <xsd:restriction base="xsd:string">
            <xsd:maxLength value="256"/>
        </xsd:restriction>
    </xsd:simpleType>
</xsd:element>
<xsd:element name="DataPlaneReference" minOccurs="0" maxOccurs="1">
<!-- Section or clause number in Reference Document that describes the Data Plane interface (4.3)-->
    <xsd:simpleType>
        <xsd:restriction base="xsd:string">
            <xsd:maxLength value="256"/>
        </xsd:restriction>
    </xsd:simpleType>
</xsd:element>
<xsd:element name="SmeName" minOccurs="0" maxOccurs="1">
<!-- Name of the Network Technology SME (4.3)-->
    <xsd:simpleType>
        <xsd:restriction base="xsd:string">
            <xsd:maxLength value="256"/>
        </xsd:restriction>
    </xsd:simpleType>
</xsd:element>
<xsd:element name="SmeReference" minOccurs="0" maxOccurs="1">
<!-- Section or clause number in Reference Document that describes the SME (4.3) -->
    <xsd:simpleType>
        <xsd:restriction base="xsd:string">
            <xsd:maxLength value="256"/>
        </xsd:restriction>
    </xsd:simpleType>
</xsd:element>
<xsd:element name="Ieee8021Bridging" minOccurs="0" maxOccurs="1">
<!-- Network Technology supports IEEE 802.1 bridging (5.1.2.2)-->
    <xsd:simpleType>
        <xsd:restriction base="xsd:NMTOKEN">
            <xsd:enumeration value="True"/>
            <xsd:enumeration value="False"/>
        </xsd:restriction>
    </xsd:simpleType>
</xsd:element>
<xsd:element name="VariantSpecific" minOccurs="1" maxOccurs="1">
<!-- Specific information of the Variant (Table 6-12)-->
    <xsd:simpleType>
        <xsd:restriction base="xsd:string">
            <xsd:maxLength value="128"/>
        </xsd:restriction>
    </xsd:simpleType>
</xsd:element>
<xsd:element name="InterfaceTypeMessageArray" minOccurs="0" maxOccurs="1">
<!-- Security message_array (Table 9-12) -->
    <xsd:simpleType>
        <xsd:restriction base="xsd:string">
            <xsd:maxLength value="256"/>
        </xsd:restriction>
    </xsd:simpleType>
</xsd:element>
<xsd:element name="UKeyDerivation" minOccurs="0" maxOccurs="1">
<!-- String expressing how to derive the Network Technology U-Key from the 1905 network key (9.2.1.1)
-->
        <xsd:simpleType>
            <xsd:restriction base="xsd:string">
            </xsd:restriction>
        </xsd:simpleType>
</xsd:element>
<xsd:element name="CoexistenceMechanism" minOccurs="0" maxOccurs="1">
<!-- Name of Coexistence Methods used by the networking technology variant-->
    <xsd:simpleType>
        <xsd:restriction base="xsd:string">
            <xsd:maxLength value="128"/>
        </xsd:restriction>
    </xsd:simpleType>
</xsd:element>
<xsd:element name="FreqStart" type="xsd:unsignedInt" minOccurs="0" maxOccurs="1"/>
<xsd:element name="FreqStop" type="xsd:unsignedInt" minOccurs="0" maxOccurs="1"/>
```

TABLE 5-continued

Generic Phy XML Schema

```
            <xsd:element name="v2" type="v2ExtensionType" minOccurs="0" maxOccurs="1"/>
            <!-- allow any element except those from target namespace -->
            <xsd:choice minOccurs="0" maxOccurs="unbounded">
                <xsd:any namespace="##other" processContents="lax"/>
                <xsd:any namespace="##local" processContents="lax"/>
            </xsd:choice>
          </xsd:sequence>
        </xsd:complexType>
      </xsd:element>
    </xsd:sequence>
  </xsd:complexType>
 </xsd:element>
 <xsd:element name="v2" type="v2ExtensionType" minOccurs="0" maxOccurs="1"/>
 <!-- allow any element except those from target namespace -->
 <xsd:choice minOccurs="0" maxOccurs="unbounded">
    <xsd:any namespace="##other" processContents="lax"/>
    <xsd:any namespace="##local" processContents="lax"/>
 </xsd:choice>
 </xsd:sequence>
</xsd:complexType>
<xsd:simpleType name="OuiType">
    <xsd:restriction base="xsd:string">
        <xsd:pattern value="([0-9a-fA-F]{2}:){2}[0-9a-fA-F]{2}">
            <!-- Datatype for representing OUI. Examples: 01:80:C2:, 01:05:10, etc. -->
            <!-- This datatype restricts each field of the OUI to have exactly 2 digits that are hexidecimal digits, -->
            <!-- i.e., [0-9a-fA-F][0-9a-fA-F]:[0-9a-fA-F][0-9a-fA-F] -->
        </xsd:pattern>
    </xsd:restriction>
</xsd:simpleType>
<xsd:simpleType name="MediaTypeIndexType">
    <xsd:restriction base="xsd:string">
        <xsd:patternvalue="([0-9a-fA-F]{2})">
        </xsd:pattern>
    </xsd:restriction>
</xsd:simpleType>
<xsd:complexType name="v2ExtensionType">
    <xsd:sequence>
        <xsd:element name="v3" type="v3ExtensionType" minOccurs="0"/>
        <!-- allow any element except those from (v2) target namespace -->
        <xsd:choice minOccurs="0" maxOccurs="unbounded">
            <xsd:any namespace="##other" processContents="lax"/>
            <xsd:any namespace="##local" processContents="lax"/>
        </xsd:choice>
    </xsd:sequence>
    <xsd:anyAttribute/>
</xsd:complexType>
<xsd:complexType name="v3ExtensionType">
    <xsd:sequence>
        <xsd:any namespace="##targetNamespace" processContents="lax" maxOccurs="unbounded"/>
    </xsd:sequence>
    <xsd:anyAttribute/>
</xsd:complexType>
</xsd:schema>
```

After retrieving the communication protocol information (316), e.g. in the form of the generic Phy XML description document, the network device 102A utilizes at least a portion of the communication protocol information to facilitate communication with the network device 102D (320). For example, the network device 102A may utilize the information contained in at least the UKeyDerivation field to determine how to derive a security mechanism, such as a network technology U-key, that is utilized by the network device 102D, e.g. for encryption. In one or more implementations, if the UKeyDerivation field is null, or empty, the network device 102A may determine that the network device 102D does not utilize encryption. The network device 102A then derives the security mechanism based at least in part on the UKeyDerivation field and utilizes the security mechanism to communicate securely with the network device 102D.

If the network device 102A determines that the communication protocol information (and/or information for accessing the communication protocol information) is stored locally (308), the network device 102A locally retrieves the communication protocol information associated with the network device 102D (or the information for accessing the communication protocol information) (318). The network device 102A then communicates with the network device 102D based at least in part on at least a portion of the communication protocol information (320).

Figure 4:
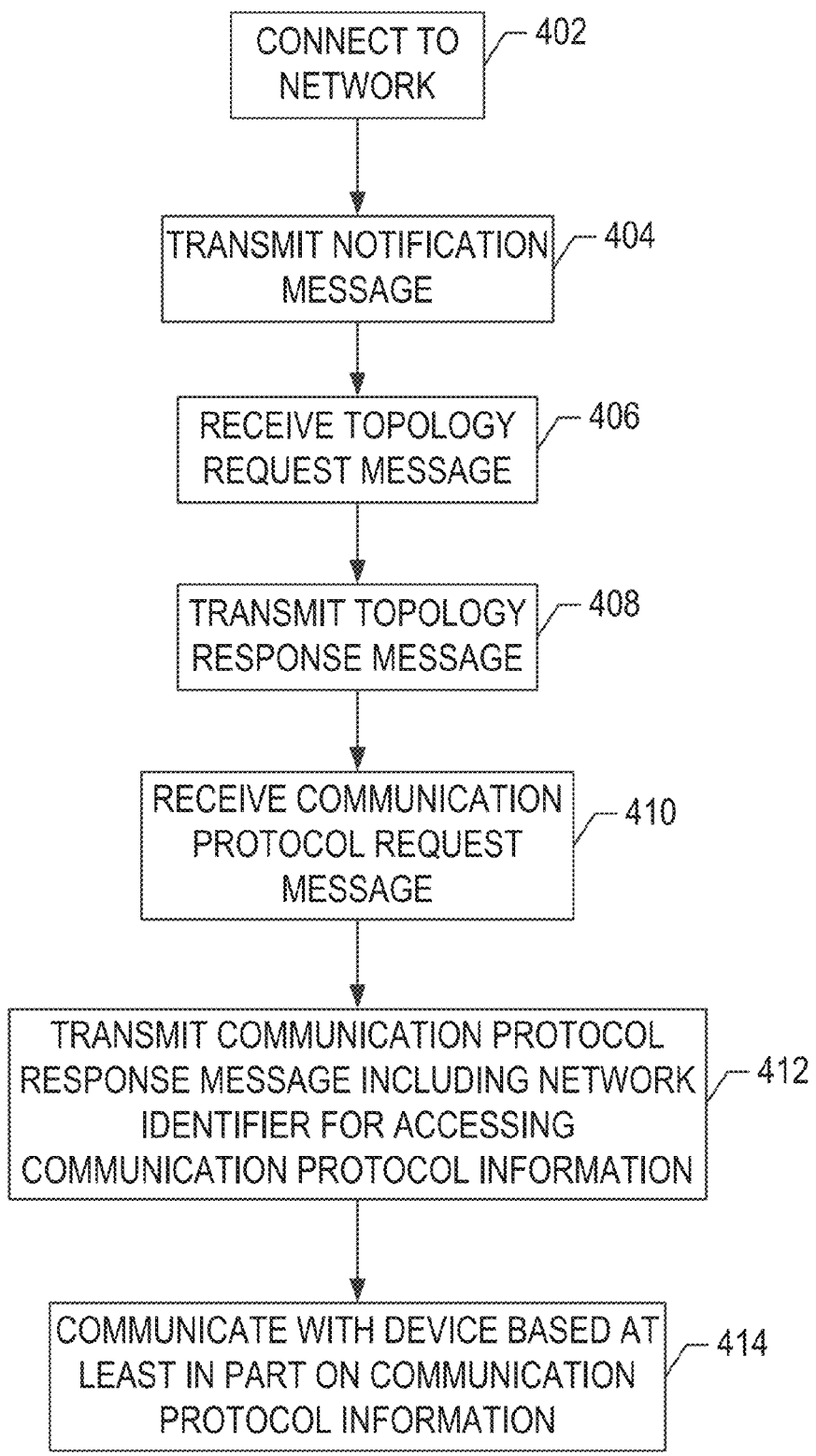
FIG. 4 illustrates a flow diagram of an example process of a network device in a system for extensible interoperability of network devices in accordance with one or more implementations.

FIG. 4 illustrates a flow diagram of an example process 400 of a network device 102D in accordance with one or more implementations. For explanatory purposes, the example process 400 is primarily described herein with reference to the network device 102D of FIGS. 1-2; however, the example process 400 is not limited to the network device 102D of FIGS. 1-2, e.g. the example process 400 may be performed by one or more of the other devices 102B-D, 104A-E, and/or the example process 400 may be performed by one or more components of the network device 102D.

Further for explanatory purposes, the blocks of the example process 400 are described herein as occurring in serial, or linearly. However, multiple blocks of the example process 400 may occur in parallel. In addition, the blocks of the example process 400 may be performed a different order than the order shown and/or one or more of the blocks of the example process 400 may not be performed.

The network device 102D connects to a network, such as the network environment 100 and/or 200 (402). The network device 102D transmits a notification message, or a discovery message, to inform the other devices 104A-C, 102A-E of its presence on the network (404). In one or more implementations, the notification message may be a broadcast or multicast message. The notification message includes a network address, and/or a device address, associated with the network device 102D. In response to transmitting the notification message (404), the network device 102D receives a topology request message, from one of the other devices 104A-C, 102A-E, such as the network device 102A (406).

In response to receiving the topology request message (406), the network device 102D transmits a topology response message, such as to the network device 102A (408). The topology response message includes a device information type TLV containing one of the media type values described in Table 1 above. For explanatory purposes, in the example process 400 the network device 102D sets the media type value to 255 (or 0xFF hexadecimal) to indicate that at least one network interface of the network device 102D utilizes a networking technology and/or variant that is not listed in Table 1.

In response to transmitting the topology response message (408), the network device 102D receives the communication protocol request message, such as from the network device 102A (410). In response to receiving the communication protocol request message (410), the network device 102D transmits, e.g. to the network device 102A, a communication protocol response message that includes a resource identifier for accessing communication protocol information associated with the network device 102D (412). In one or more implementations, the communication protocol response message may include one or more of the fields described above in Table 2. The network device 102A may utilize the resource locator to retrieve the communication protocol information associated with the network device 102D, such as in the form of an XML document that includes one or more of the fields described in Table 4 above.

The network device 102D may then communicate with the network device 102A based at least in part on the communication protocol information (414). For example, the network device 102D may utilize a security mechanism that is derivable by the network device 102A from the UKeyDerivation field. In one or more implementations, additional values and/or information may be included in the communication protocol information, such as any information that may facilitate communication between the network devices 102A,D.

Figure 5:
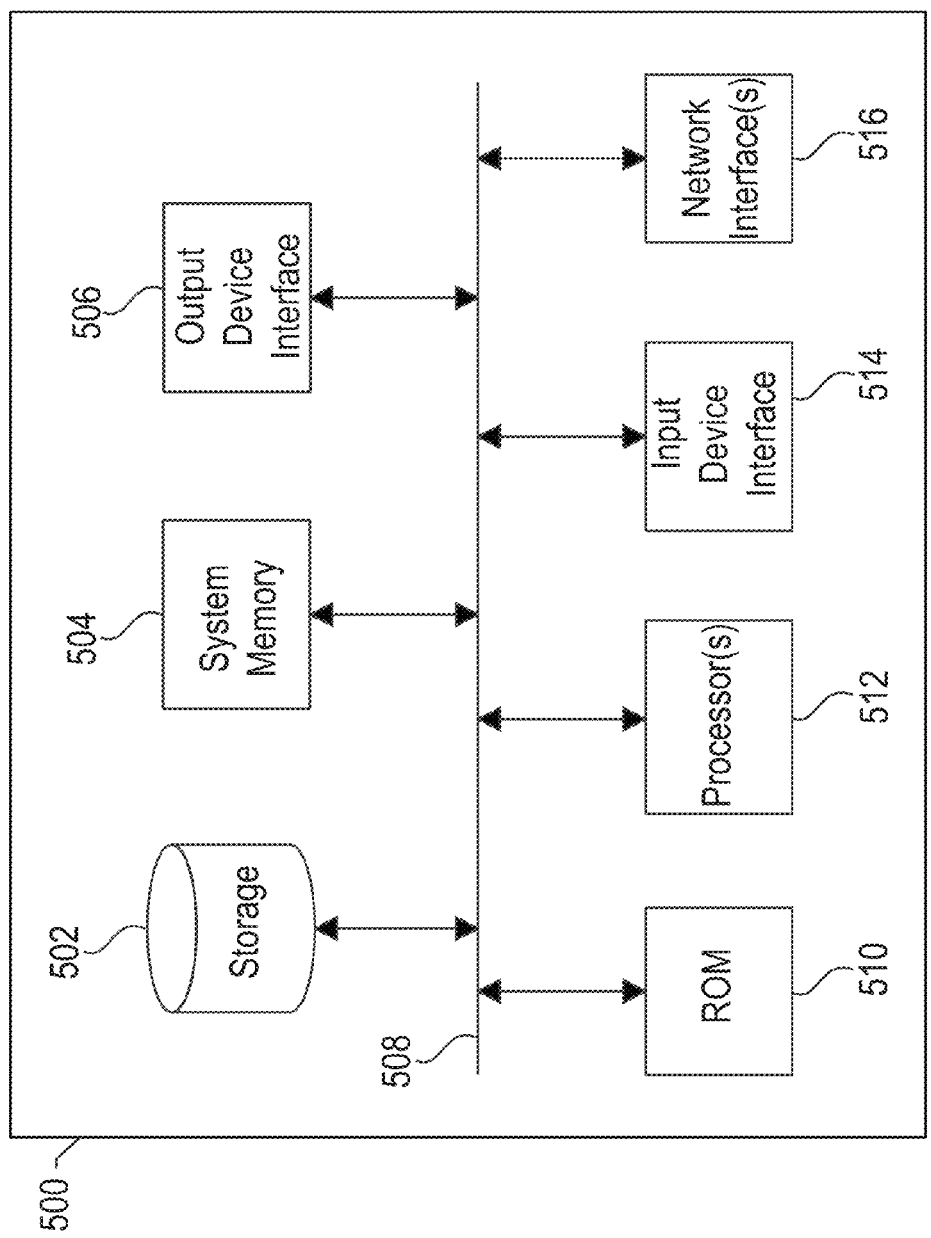
FIG. 5 conceptually illustrates an example electronic system with which one or more implementations of the subject technology can be implemented.

FIG. 5 conceptually illustrates an example electronic system 500 with which one or more implementations of the subject technology can be implemented. The electronic system 500, for example, may be, or may include, one or more of the network devices 102A-D, one or more of the electronic devices 104A-E, and/or the output device 106, one or more wearable devices, a desktop computer, a laptop computer, a tablet device, a phone, and/or generally any electronic device. Such an electronic system 500 includes various types of computer readable media and interfaces for various other types of computer readable media. The electronic system 500 includes a bus 508, one or more processing unit(s) 512, a system memory 504, a read-only memory (ROM) 510, a permanent storage device 502, an input device interface 514, an output device interface 506, one or more network interface(s) 516, and/or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are utilized by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory (RAM). The system memory 504 may store one or more of the instructions and/or data that the one or more processing unit(s) 512 may utilize at runtime. In one or more implementations, the processes of the subject disclosure are stored in the system memory 504, the permanent storage device 502, and/or the ROM 510. From these various memory units, the one or more processing unit(s) 512 retrieve instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by the electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 5, bus 508 also couples electronic system 500 to one or more networks (not shown) through one or more network interface(s) 516. The one or more network interface(s) may include Bluetooth interface, a Bluetooth low energy (BLE) interface, a Zigbee interface, an Ethernet interface, a Wi-Fi interface, a MoCA interface, a HomePlug interface, a reduced gigabit media independent interface (RGMII), or generally any interface for connecting to a network. In this manner, electronic system 500 can be a part of one or more networks of computers (such as a local area network (LAN), a personal area network (PAN), a peer-to-peer network (P2P), a wide area network (WAN), or an Intranet, or a network of networks, such as the Internet. Any or all components of electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, SSD, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "access point", "receiver", "computer", "server", "processor", and "memory" all refer to electronic or other technological devices. These terms exclude people or groups of people. For the purposes of the specification, the terms "display" or "displaying" means displaying on or by an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A network device comprising:
   at least one processor circuit that is configured to:
      identify another network device on a network;
      receive a message from the another network device that comprises a uniform resource locator for accessing communication protocol information associated with the another device;
      retrieve the communication protocol information via the uniform resource locator; and
      utilize at least a portion of the communication protocol information to facilitate communications with the another network device over the network.

2. The network device of claim 1, wherein the at least one processor circuit is further configured to:
   retrieve, over an external network that is distinct from the network, the communication protocol information from a remote server via the uniform resource locator.

3. The network device of claim 2, wherein the remote server is distinct from the network device and the another network device.

4. The network device of claim 3, wherein the communication protocol information comprises an extensible markup language (XML) document stored at the remote server.

5. The network device of claim 4, wherein the XML document comprises: a name of a networking technology organization associated with the another network device, an organizationally unique identifier (OUI) or company identifier (CID) of the networking technology organization associated with the another network device, a name of a networking technology variant associated with the another network device, and information for deriving at least one key associated with the another network device.

6. The network device of claim 5, wherein the at least one processor is configured to:
   derive the at least one key associated with the another network device based at least in part on the information for deriving the at least one key; and
   communicate with the another device based at least in part on the at least one key.

7. The network device of claim 1, wherein the network device comprises a first bridge device associated with a first networking technology and the another network device comprises a second bridge device associated with a second networking technology that is distinct from the first networking technology.

8. The network device of claim 1, wherein the at least one processor circuit is further configured to:
   receive a notification message from the another device, the notification message comprising a network address of the another device;
   transmit a topology request message to the another network device using the network address of the another device;
   receive a topology response message from the another network device, wherein the topology response message comprises an media type field that is set to a value that indicates that the communication protocol information associated with the network device should be obtained by the another network device;
   transmit a request message to the another network device; and
   receive the message in response to the request message.

9. The network device of claim 8, wherein the value comprises 255 or 0xFF.

10. A method implemented by a network device, the method comprising:
   receiving a topology request message from another network device over a network;
   transmitting a topology response message to the network device over the network, wherein the topology response message comprises an indication that communication protocol information associated with the network device should be retrieved by the another network device;
   receiving a communication protocol request message from the another device; and
   transmitting a communication protocol response message that comprises a resource identifier for retrieving the communication protocol information stored at a remote server.

11. The method of claim 10, wherein the remote server is distinct from the network device and the another network device.

12. The method of claim 10, wherein the network device comprises a first bridge device for a first networking technology and the another network device comprises a second bridge device for a second networking technology that is distinct from the first networking technology.

13. The method of claim 10, wherein the topology response message comprises a media type field that is set to a fixed value to indicate that the communication protocol information associated with the network device should be retrieved by the another network device.

14. The method of claim 13, wherein the fixed value comprises 255 or 0xFF.

15. The method of claim 10, wherein the communication protocol information comprises an extensible markup language (XML) document stored at the remote server, the XML document including: a name of a networking technology organization associated with the network device, an organizationally unique identifier (OUI) or company identifier (CID) of the networking technology organization associated with the network device, a name of a networking technology variant associated with the network device, and information for deriving at least one key associated with the network device.

16. The method of claim 15, further comprising:
deriving the at least one key associated with the network device based at least in part on the information for deriving the at least one key; and
communicating with the another device based at least in part on the at least one key.

17. A computer program product comprising instructions stored in a tangible non-transitory computer-readable storage medium, the instructions comprising:
instructions to receive a notification message from a network device over a network, the notification message comprising a network address of the network device;
instructions to transmit a topology request message to the network device over the network, the topology request message being addressed to the network address of the network device;
instructions to receive a topology response message from the network device over the network, wherein the topology response message comprises a communication protocol indicator associated with the network device;
instructions to determine whether the communication protocol indicator indicates that communication protocol information associated with the network device is stored locally or should be requested from the network device;
when the communication protocol indicator indicates that the communication protocol information should be requested from the network device:
instructions to transmit a communication protocol request message to the network device over the network;
instructions to receive a communication protocol response message from the network device over the network, the communication protocol response message comprising a resource identifier for retrieving the communication protocol information for communicating with the device; and
instructions to retrieve the communication protocol information via the resource identifier over an external network; and
instructions to utilize at least a portion of the communication protocol information to facilitate communication with the network device over the network.

18. The computer program product of claim 17, wherein the instructions further comprise:
instructions to retrieve the communication protocol information from a local storage device when the communication protocol indicator indicates that the communication protocol information is stored locally.

19. The computer program product of claim 17, wherein the communication protocol information comprises an extensible markup language (XML) document including a name of a networking technology organization associated with the network device, an organizationally unique identifier (OUI) or company identifier (CID) of the networking technology organization associated with the network device, a name of a networking technology variant associated with the network device, and information for deriving at least one key associated with the network device.

20. The computer program product of claim 19, wherein the instructions further comprise:
instructions to derive the at least one key associated with the network device based at least in part on the information for deriving the at least one key; and
instructions to communicate with the network device based at least in part on the at least one key.

* * * * *